United States Patent [19]
Stark et al.

[11] Patent Number: 5,967,636
[45] Date of Patent: Oct. 19, 1999

[54] COLOR WHEEL SYNCHRONIZATION APPARATUS AND METHOD

[75] Inventors: Steven E. Stark, Portland, Oreg.; Edmund D. Passon, Eindhoven, Netherlands

[73] Assignee: In Focus Systems, Inc., Wilsonville, Oreg.

[21] Appl. No.: 09/136,799

[22] Filed: Aug. 19, 1998

[51] Int. Cl.[6] .................................................. G03B 21/14
[52] U.S. Cl. ............................................. 353/84; 348/743
[58] Field of Search ................................ 353/31, 84, 121, 353/122; 345/207, 31, 32; 348/742, 743, 760, 771

[56] References Cited

U.S. PATENT DOCUMENTS

| | | | |
|---|---|---|---|
| 5,508,738 | 4/1996 | Janssen et al. | 348/196 |
| 5,657,036 | 8/1997 | Markandley et al. | 345/85 |
| 5,691,780 | 11/1997 | Marshall et al. | 348/743 |
| 5,706,061 | 1/1998 | Marshall et al. | 348/743 |
| 5,805,243 | 9/1998 | Hatano et al. | 353/84 |
| 5,831,601 | 11/1998 | Vogeley et al. | 345/175 |
| 5,863,125 | 1/1999 | Doany | 353/84 |

FOREIGN PATENT DOCUMENTS 1-238688  9/1989  Japan ........................................ 353/84

*Primary Examiner*—William Dowling
*Attorney, Agent, or Firm*—Stoel Rives LLP

[57] ABSTRACT

A multimedia projector (30) employing a color wheel (42) in a frame sequential color display system includes a light sensor (68) positioned to receive light scattered from a point in an optical path (34) after the color wheel. The light sensor detects particular colors of light propagating through red, green, and blue filter segments (R, G, and B) on the color wheel and toward a display device (50). The light sensor provides, without any adjustments, an inherently accurate timing mark signal (78) to a display controller (56) to ensure that red, green, and blue image data are properly synchronized with the respective filter segments R, G, and B. In particular, the light sensor receives polychromatic light through a yellow optical filter (74) to illuminate an optoelectric detector (70) that is responsive to visible and near IR light wavelengths. The photodetector drives a timing mark signal generator (80) to detect a sudden increase in yellow (red plus green) light, which indicates to the display controller that filter segment R has just rotated into the optical path.

20 Claims, 3 Drawing Sheets

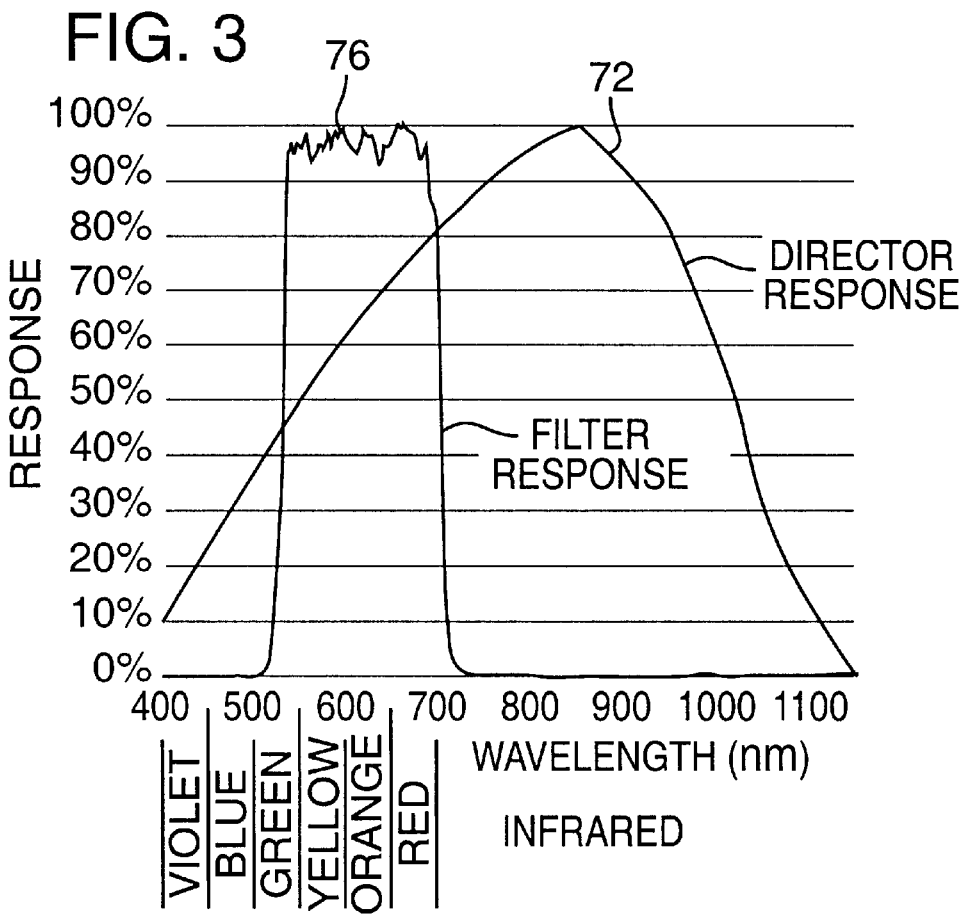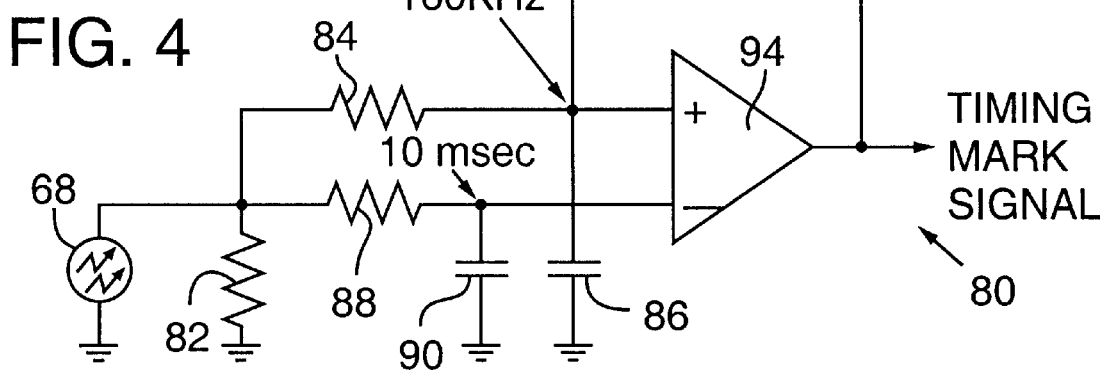

COLOR WHEEL SYNCHRONIZATION APPARATUS AND METHOD

TECHNICAL FIELD

This invention relates to image projection displays and more particularly to a color wheel synchronization technique employed in an optical pathway of such displays.

BACKGROUND OF THE INVENTION

Projection systems have been used for many years to project motion pictures and still photographs onto screens for viewing. More recently, presentations using multimedia projection systems have become popular for conducting sales demonstrations, business meetings, and classroom instruction.

In a common operating mode, multimedia projection systems receive analog video signals from a personal computer ("PC"). The video signals may represent still, partial-, or full-motion display images of a type rendered by the PC. The analog video signals are typically converted in the projection system into digital video signals that control a digitally driven image-forming device, such as a liquid crystal display ("LCD") or a digital micromirror device ("DMD").

A popular type of multimedia projection system employs a light source and optical path components upstream and downstream of the image-forming device to project the image onto a display screen. An example of a DMD-based multimedia projector is the model LP420 manufactured by In Focus Systems, Inc., of Wilsonville, Oreg., the assignee of this application.

Significant effort has been invested into developing projectors producing bright, high-quality, color images. However, the optical performance of conventional projectors is often less than satisfactory. For example, suitable projected image brightness is difficult to achieve, especially when using compact portable color projectors in a well-lighted room.

Because LCD displays have significant light attenuation and triple path color light paths are heavy and bulky, portable multimedia projectors typically employ DMD displays in a single light path configuration. Producing a projected color image with this configuration typically requires projecting a frame sequential image through some form of sequential color modulator, such as a color wheel.

The use of color wheels in frame sequential color ("FSC") display systems has been known for many years and was made famous (or infamous) in early attempts to develop color television sets. However, more modern color wheel display implementations are still useful today.

FIG. 1 shows a typical prior art FSC display system 10 in which a sensor 12 senses a timing mark 14 to detect a predetermined color index position of a motor 16 that rotates a color wheel 18 having respective red, green, and blue filter segments R, G, and B. A light source 20 projects a light beam 22 through color wheel 18 and a relay lens 24 onto a display device 26, such as an LCD-based light valve or a DMD. A display controller (not shown) drives display device 26 with sequential red, green, and blue image data that are timed to coincide with the propagation of light beam 22 through the respective filter segments R, G, and B of color wheel 18. Clearly, successful operation of a FSC display system depends on properly synchronizing the red, green, and blue image data to the angular position of color wheel 18.

Sensor 12 typically employs any of optoelectrical or electromechanical shaft position or motor armature position detectors and usually requires some means for aligning timing mark 14 to the start of one of the filter segments. This alignment is typically a costly and error prone mechanical adjustment that accounts for angular differences between motor 16 and the mechanical mounting of filter segments R, G, and B. Of course, electrical or mechanical delays associated with sensor 12 further contribute to alignment errors.

The accumulated angular errors open the possibility of synchronization errors between the red, green, and blue image data to the angular position of color wheel 18, a possibility that prior workers avoided by building a timing duty cycle into the display controller electronics. The timing duty cycle provides for driving display device 26 with the red, green, and blue image data for only a portion of the time when light beam 22 is propagating through each of respective filter segments R, G, and B, thereby preventing illuminating display device 26 with an improper color. Unfortunately, the timing duty cycle reduces the total amount of illumination available for displaying each color and, therefore, reduces the brightness of the resultant displayed color image.

What is needed, therefore, is a color wheel synchronization technique that substantially eliminates any mechanical, optical, and electrical rotational timing errors that are intrinsic to prior color wheel systems.

SUMMARY OF THE INVENTION

An object of this invention is, therefore, to provide an apparatus and a method for detecting an angular position of a color wheel in an FSC display system.

Another object of this invention is to provide an apparatus and a method for a multimedia projector having increased display brightness.

A further object of this invention is to provide a lighter weight, simpler, and less costly multimedia projector.

A multimedia projector employing a color wheel in an FSC display system positions a color selective light sensor adjacent to a light propagation path following the color wheel to detect a particular color or colors of light propagating through the color wheel toward the display device. The sensor does not depend on the angular alignment of any timing marks and directly detects a color or colors of the illumination light, The sensor provides without any adjustments an inherently accurate index mark signal to a display controller to ensure that the appropriate red, green, and blue image data are properly synchronized with the respective color filter segments R, G, and B. The timing accuracy of this invention allows for an increased display controller timing duty cycle, which provides a brighter projected display.

The color selective light sensor receives polychromatic light through a yellow (red plus green) filter to illuminate a photodetector that is responsive to visible and near infrared ("IR") light wavelengths. The photodetector detects the presence of yellow light, which marks the reception of red light, and drives a combination amplifier/integrator/comparator circuit that provides to the display controller a timing mark signal coincident with the occurrence of the red light.

This invention is advantageous because the timing mark synchronization accuracy is independent of moderate illumination intensity changes, mechanical alignment errors, and color wheel rotational velocity changes.

This invention is further advantageous because the integrator produces a signal indicative of the light source illumination level, which may be used to track light source life and condition and thus predict lamp change events.

The inherent simplicity and accuracy of this invention provides a lighter weight, simpler, brighter, and less costly multimedia projector.

Additional objects and advantages of this invention will be apparent from the following detailed description of a preferred embodiment thereof that proceeds with reference to the accompanying drawings.

BRIEF DESCRIPTION OF THE DRAWINGS

FIG. 3 graphically represents the spectral responses of an optoelectric detector and a filter employed in the color wheel synchronization technique of this invention.

FIG. 4 is a simplified schematic circuit diagram of a timing mark signal generator that conditions, integrates, and threshold detects signals received from the optoelectric detector of FIG. 3.

DETAILED DESCRIPTION OF A PREFERRED EMBODIMENT

Figure 1:
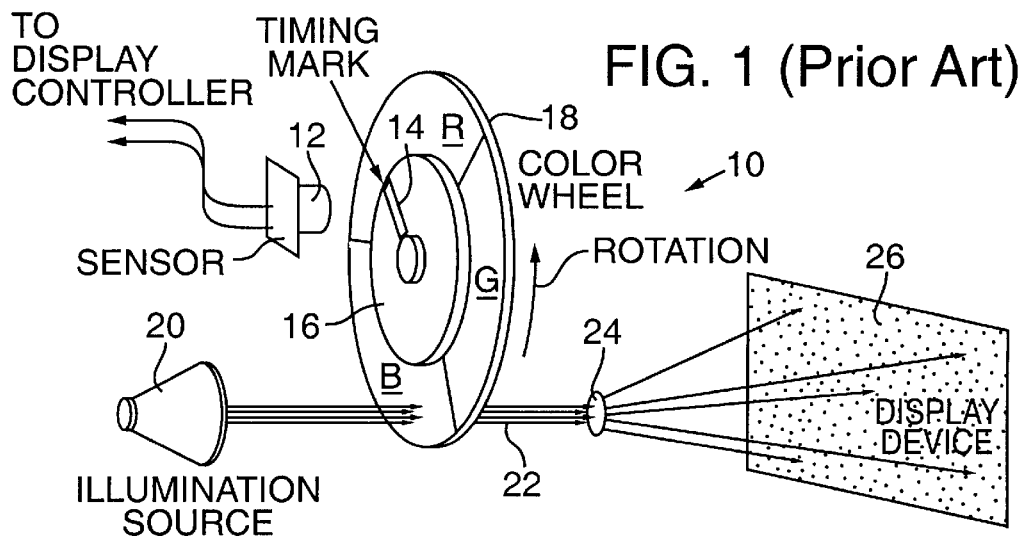
FIG. 1 is a simplified pictorial diagram showing the operating principle of a prior art FSC display device employing a color wheel having an optoelectrically sensed timing mark.
Figure 2:
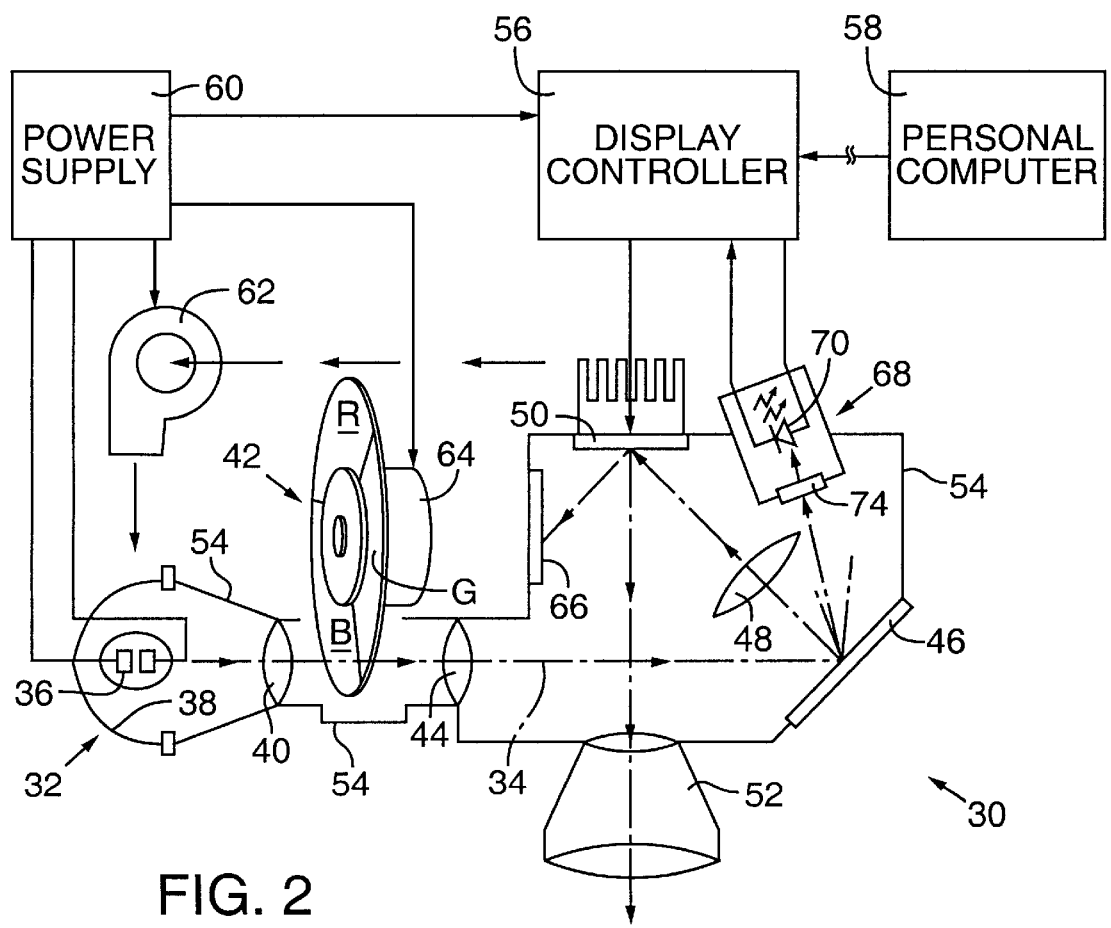
FIG. 2 is a simplified pictorial and electrical block diagram of a multimedia projector showing a light path employing a color wheel synchronization technique of this invention.

FIG. 2 shows a multimedia projector 30 of this invention in which a light source 32 emits polychromatic light that propagates along a folded optical path 34 through projector 30. Light source 32 is preferably a 270 watt metal halide arc lamp 36 with an integral elliptical reflector 38.

Optical path 34 is defined by various optical components including a condenser lens 40, a color wheel 42, an airspace doublet lens 44, a fold mirror 46, a relay lens 48, a display device 50, and a projection lens group 52. Display device 50 is preferably a DMD but may alternatively be a reflective complementary metal oxide semiconductor ("CMOS") array device or an LCD light valve. Projection lens 52 is preferably a fixed focal length lens but may also be a varifocal or zoom lens.

The optical components are held together by an optical frame 54 that is enclosed within a projector housing (not shown). To provide mechanical rigidity and dissipate heat, optical frame 54 is preferably formed as a magnesium die casting. A display controller 56 that includes a microprocessor receives color image data from a PC 58 and processes the image data into frame sequential red, green, and blue image data, sequential frames of which are conveyed to DMD 50 in proper synchronism with the angular position of color wheel 42. A power supply 60 is electrically connected to light source 32 and display controller 56 and also powers a cooling fan 62 and a free running DC motor 64 that angularly rotates color wheel 42.

Display controller 56 controls a high-density array of digitally deflected mirrors in display device 50 such that light propagating from relay lens 48 is selectively reflected by each mirror in the array either toward projection lens 52 or toward a light-absorbing surface 66 mounted on or near optical frame 54. The light reflecting off deflected mirrors in display device 50 propagates through projection lens 52 for display on a screen (not shown), and the light reflecting off nondeflected mirrors in display device 50 is absorbed by light-absorbing surface 66.

Synchronization of the frame sequential red, green, and blue image data to the angular position of color wheel 42 is carried out as follows. DC motor 64 rotates color wheel 42 at about 6,650 rpm (110 rps) to about 7,500 rpm (125 rps). Color wheel 42 includes color filter segments R, G, and B that each surround about 120 degrees of color wheel 42. At the rotational velocities described above, each color filter segment is in optical path 34 for a time period ranging from about 2.7 milliseconds to about 3 milliseconds.

Color wheel synchronization is achieved by detecting which color filter segment is in optical path 34 and for how long. In this invention, a particular color of light propagating through color wheel 42 is sensed to generate synchronization timing data. In particular, a color selective light sensor 68 is positioned off optical path 34 and adjacent to relay lens 48 to receive light scattered off fold mirror 46, a position that does not intercept any ultimately projected light. Light source 32 has sufficient intensity to allow receiving scattered light at various locations within optical frame 54. The preferred position allows convenient mounting of light sensor 68 into a black plastic cover (not shown) that covers and light seals optical frame 54. Because optical frame 54 is formed from a reflective metal, light-absorbing surface 66 is preferably formed by a black plastic fin protruding from the cover into optical frame 54.

Referring also to FIG. 3, light sensor 68 includes an optoelectric detector 70 having a maximum spectral response 72 to deep red and near IR light wavelengths. Optoelectric detector 70 is preferably a model SFH 203 manufactured by Siemens Components of Cupertino, Calif. The spectral selectivity of optoelectric detector 70 is tuned by an optical filter 74 inserted between the scattered light and optoelectric detector 70. Optical filter 74 is preferably a predominantly yellow filter having a filter response 76 that passes green, yellow, orange, and red wavelengths of light but attenuates blue wavelengths of light.

Filter segments R, G, and B are typically separated by very narrow gaps, through which some of the polychromatic light emitted by light source 32 may leak. Because polychromatic, red, and green light are all substantially propagated through optical filter 74, light sensor 68 does not significantly discriminate between the polychromatic light leaking through the gaps and the light propagating through filter segments R and G. However, because optical filter 74 attenuates blue wavelengths of light, the entry and exit of filter segment B in optical path 34 is readily detected by light sensor 68. Moreover, because filter segment B immediately rotationally precedes filter segment R, the exit of filter segment B from optical path 34 is preferably used to generate a timing mark signal 78 indicating the entry of filter segment R into optical path 34. Any polychromatic light propagating through the gap between filter segments B and R is simply interpreted by light sensor 68 as the start of filter segment R. This is actually beneficial because it compensates for timing mark signal 78 processing delays in light sensor 68 and display controller 56.

Figure 5:
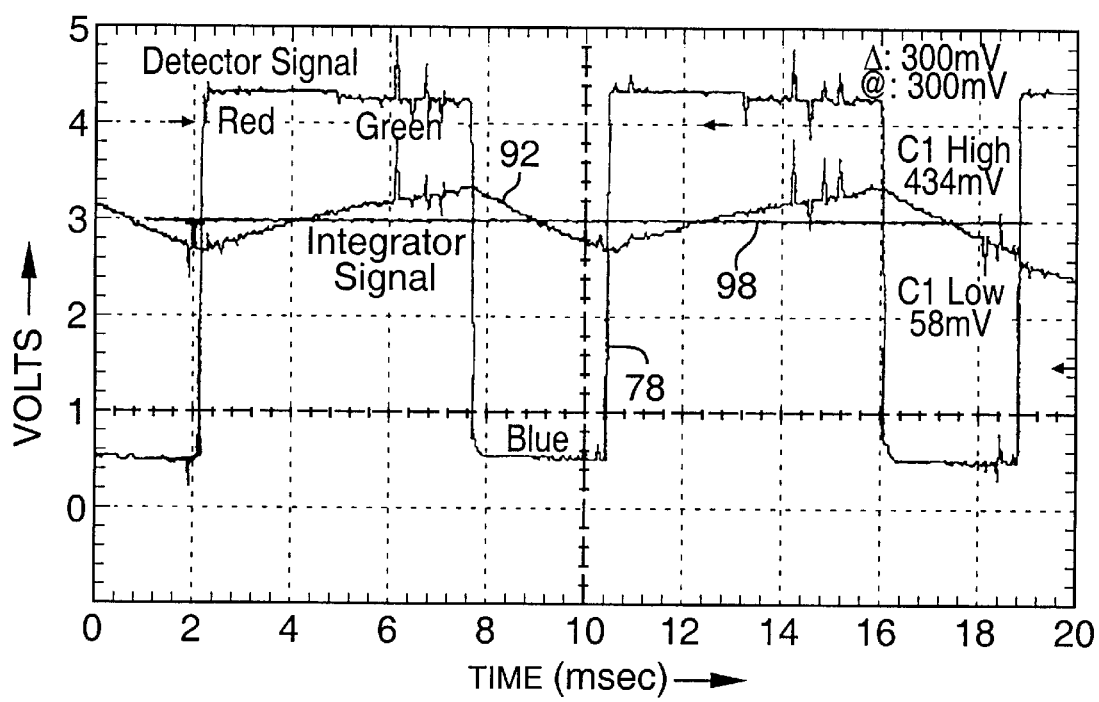
FIG. 5 graphically represents various electrical waveforms generated by the index mark signal generator of FIG. 4.

FIGS. 4 and 5 respectively show a timing mark signal generator 80 of this invention and electrical waveforms appearing therein. Light sensor 68 generates a detector signal across a 10,000 ohm resistor 82, which detector signal is electrically connected to the respective filter and integrator inputs of timing mark signal generator 80.

The filter input includes a 10,000 ohm resistor 84 electrically connected in series with a 100 picoFarad capacitor 86 to form at their junction a low pass filter node having a 160 kilohertz cutoff frequency suitable for reducing bursty signal noise. A filtered detector signal appears at the low pass filter node.

The integrator input includes a 100,000 ohm resistor 88 electrically connected in series with a 0.1 microfarad capacitor 90 to form at their junction an integrator node having a 10 millisecond time constant suitable for integrating the detector signal. An integrated detector signal 92 appears at the integrator node.

The filter and integrator nodes are electrically connected to respective noninverting and inverting inputs of a comparator 94, which is preferably a type LM392 manufactured by National Semiconductor, Inc. of Mountain View, Calif.

Comparator 94 functions as a threshold comparator that compares the filtered detector signal appearing on the filter node to a threshold level, which is preferably integrated detector signal 92 that appears on the integrator node. Timing mark signal 78 appears at the output of comparator 94 as a nonsymmetrical squarewave having about a 0.6 volt "low" value when filter segment B is in optical path 34 and having about a 4.4 volt "high" value when filter segment B is not in optical path 34 (filter segment R or G or a gap is in optical path 34). A 3.32 megohm feedback resistor 96 is electrically connected between the output and noninverting input of comparator 94 to provide the threshold level with about a 20 millivolt hysteresis band. The hysteresis band increases the switching speed and improves the noise immunity of comparator 94.

Employing integrated detector signal 92 as a comparator threshold level provides an automatic threshold adjustment function that accounts for long-term changes in the intensity of light source 32. Moreover, integrated detector signal 92 has an average value 98 that is indicative of the intensity of light source 32. Because metal halide arc lamp 36 has an end-of-life time defined as the time when its intensity degrades to 50% of its original intensity, average value 98 can be monitored to predict when to replace arc lamp 36.

This invention is advantageous because the timing mark synchronization accuracy is independent of moderate illumination intensity changes, mechanical alignment errors, and color wheel rotational velocity changes.

This invention is further advantageous because the integrator produces a signal indicative of the light source illumination level, which may be used to track light source life and condition and thus predict lamp change events.

The inherent simplicity and accuracy of the color wheel synchronization technique of this invention enables implementing a lighter weight, simpler, brighter, and less costly multimedia projector.

Skilled workers will recognize that portions of this invention may be implemented differently than the implementations described above for a preferred embodiment. For example, this invention is suitable for use with many different optical paths, light sources, display devices, display controllers, and FSC data formats. The color wheel may have a variety of different filter segment colors, color combinations, and rotational sequence orders, and their individual angular widths may be unequal to compensate for different filter factors and light path-related color attenuations. Likewise, the light sensor may synchronize the display controller in many different ways including detecting the appearance or disappearance of any filter wheel segment color or combinations of colors. Finally, the timing mark signal generator is not limited to the particular circuit topology and values described. Indeed, the microprocessor in display controller 56 may provide adequate signal processing capacity to completely or partly replace the functions provided by timing mark signal generator 80.

Skilled workers will further recognize that many changes may be made to the details of the above-described embodiment of this invention without departing from the underlying principles thereof. Accordingly, it will be appreciated that this invention is also applicable to color synchronization applications other than those found in multimedia projectors. The scope of the present invention should, therefore, be determined only by the following claims.

We claim:

1. An apparatus for synchronizing a color modulation device and frame sequential color image data, comprising:
   a light source emitting a polychromatic light beam that propagates along an optical path;
   a color modulation device positioned in the optical path to change the polychromatic light beam into a color modulated light beam having a scattered beam component;
   a color sensitive light sensor positioned adjacent to the optical path for receiving the scattered component of the color modulated light beam and generating a tinting mark signal in response to receiving predetermined wavelengths of the scattered beam component; and
   a display controller receiving the timing mark signal and generating the frame sequential color image data in synchronism with the timing mark signal.

2. The apparatus of claim 1 further including a display device that receives the frame sequential color image data and the color modulated light beam and responds by producing a displayable color image.

3. The apparatus of claim 2 in which the apparatus is employed in a multimedia projector.

4. The apparatus of claim 2 in which the display device is one of a digital micromirror device, a liquid crystal device, and a reflective complementary metal oxide semiconductor array.

5. The apparatus of claim 1 in which the color selective light sensor further includes an optical filter that passes the predetermined wavelengths of the scattered beam component and substantially blocks other wavelengths of the scattered beam component.

6. The apparatus of claim 5 in which the optical filter is a yellow filter.

7. The apparatus of claim 1 in which the color selective light sensor includes a photodetector having a maximum sensitivity to red wavelengths and near infrared wavelengths of light.

8. The apparatus of claim 1 in which the color modulation device is a color wheel.

9. The apparatus of claim 8 in which the color wheel includes red, green, and blue filter segments.

10. The apparatus of claim 8 in which the color wheel is rotated by a free-running motor.

11. The apparatus of claim 8 in which the timing mark signal is inherently synchronized to a rotational angle of the color wheel without requiring at least one of an electrical adjustment and a mechanical adjustment.

12. The apparatus of claim 1 in which the timing mark signal is processed by a low-pass filter to produce a signal indicative of an intensity of the color modulated light beam, the signal being used to predict a light source change event.

13. The apparatus of claim 1 in which the light source is a metal halide arc lamp.

14. A method for synchronizing a color modulation device and frame sequential color image data, comprising:

emitting a polychromatic light beam that propagates along an optical path;

positioning a color modulation device in the optical path to change the polychromatic light beam into a color modulated light beam having a scattered beam component;

positioning a color sensitive light sensor adjacent to the optical path for receiving the scattered component of the color modulated light beam;

generating a timing mark signal in response to receiving predetermined wavelengths of the scattered beam component; and receiving the timing mark signal and generating the frame sequential color image data in synchronism with the timing mark signal.

15. The method of claim 14 further including providing a display device that receives the frame sequential color image data and the color modulated light beam and responds by producing a displayable color image.

16. The method of claim 14 in which the positioning a color selective light sensor step further includes filtering the scattered beam component to pass the predetermined wavelengths and substantially block other wavelengths of the scattered beam component.

17. The method of claim 14 in which the color modulation device is a color wheel.

18. The method of claim 17 in which the color wheel includes red, green, and blue filter segments.

19. The method of claim 17 further including rotating the color wheel with a free-running motor.

20. The method of claim 14 further including low-pass filtering the timing mark signal to produce a signal indicative of an intensity of the color modulated light beam and using the signal to determine whether the light source requires changing.

* * * * *

UNITED STATES PATENT AND TRADEMARK OFFICE
CERTIFICATE OF CORRECTION

PATENT NO : 5,967,636
DATED : October 19, 1999
INVENTOR(S) : Steven E. Stark and Edmund D. Passon It is certified that error appears in the above-identified patent and that said Letters Patent are hereby corrected as shown below:

Column 2, line 45, "light," should read --light.--.

Claim 1, Column 6, line 25, "tinting" should read --timing--.